Nov. 27, 1923.   1,475,373
H. H. DEULEY
CONSTRUCTION OF AND METHOD OF OPERATING HEATING FURNACES
Filed July 15, 1922   2 Sheets-Sheet 1
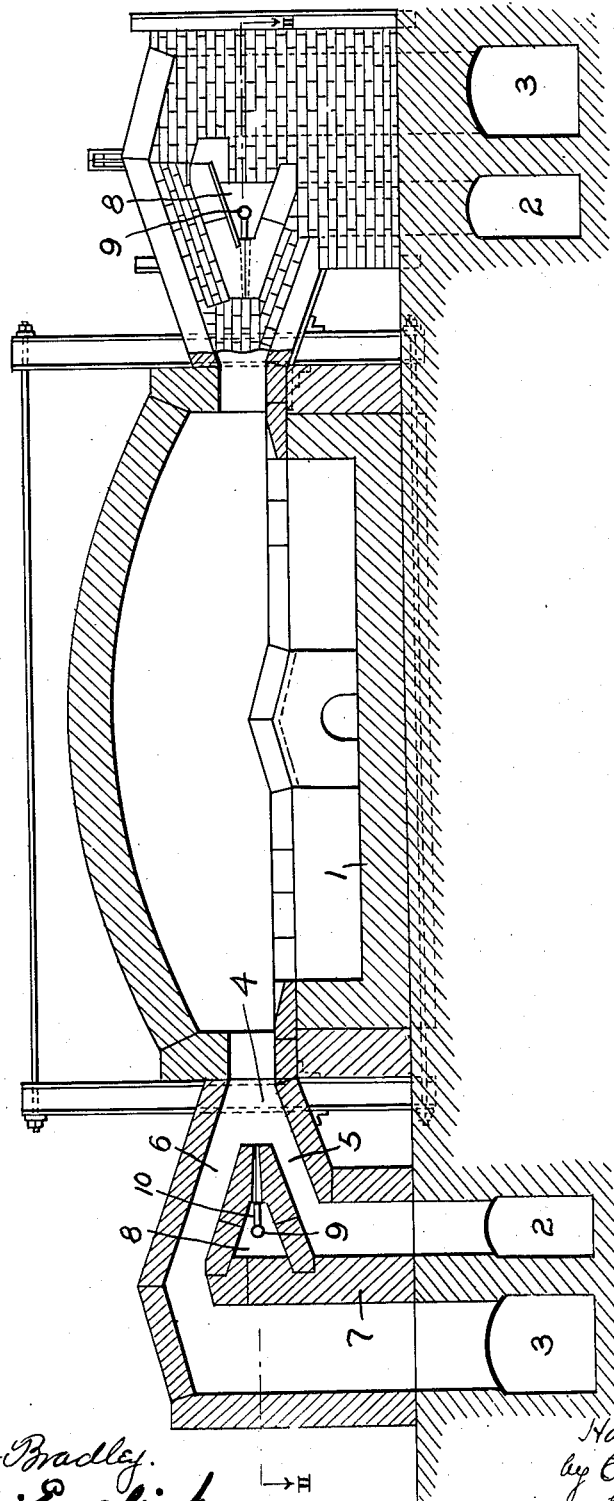
WITNESSES
J. Herbert Bradley.
Percy C. English.
INVENTOR
Harvey H. Deuley
by Christy and Christy
his attorneys

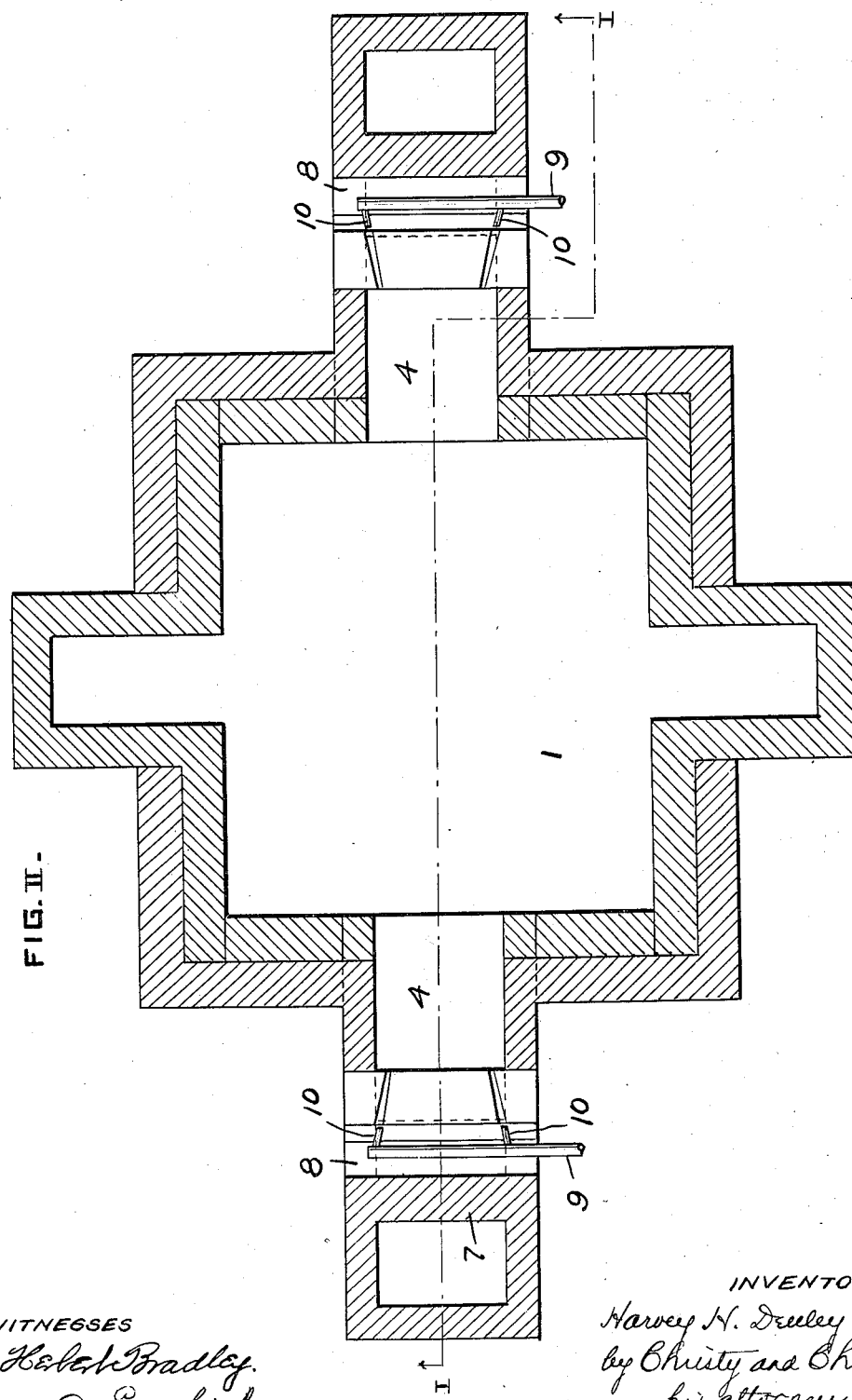

Patented Nov. 27, 1923.

1,475,373

UNITED STATES PATENT OFFICE.

HARVEY H. DEULEY, OF ROCHESTER, PENNSYLVANIA.

CONSTRUCTION OF AND METHOD OF OPERATING HEATING FURNACES.

Application filed July 15, 1922. Serial No. 575,208.

*To all whom it may concern:*

Be it known that I, HARVEY H. DEULEY, residing at Rochester, in the county of Beaver and State of Pennsylvania, a citizen of the United States, have invented or discovered certain new and useful Improvements in Constructions of and Methods of Operating Heating Furnaces, of which improvements the following is a specification.

My invention relates to improvements in the construction of and in the method of operation of heating furnaces, and, more particularly, of regenerative furnaces. I have developed it in connection with and in application to regenerative glass furnaces, and in that application I shall describe it. But it will be understood that, having the broader aspects of the invention in view, the application to a glass furnace is exemplary; the applicability is general. The objects of invention are simplicity and durability of structure and efficiency in service.

A glass tank furnace in the structure of which and in the operation of which my invention is embodied and achieved, is illustrated in the accompanying drawings. Fig. I is a view partly in vertical section, partly in side elevation of the furnace; Fig. II is a view in horizontal section. In Fig. II the section line I—I indicates the line on which Fig. I is made, and, correspondingly, the section line II—II, Fig. I, indicates the line on which Fig. II is made.

The furnace hearth is indicated at 1. 2 is the gas passageway; 3 the air passageway. These passageways unite in the port 4. On one side gas and air enter the furnace through port 4, on the other side the hot gases of combustion escape through port 4. Passageways 2 and 3 are in communication with regenerators, and to the regenerators on one side gas and air are supplied, while from the regenerators on the other side there is suitable connection to a stack. The regenerators, the connecting passageways, and the reversing valves are all well known, and are not here shown. Suffice it to say that at suitable successive intervals as furnace operation progresses the reversing valves are shifted; that which was the intake end of the furnace becomes the outgo end and that which was the outgo end becomes the intake end. Gas and air come to the port at the intake end heated by recent passages through regenerators; the hot gases of combustion pass from the furnace to the opposite regenerators and heat them, preparatory to service for heating the gas and air on reversal of the valves.

It is to the particular arrangement of the gas and air passageways as they converge to the furnace port 4 that I direct attention. Tracing the course of the entering streams of air and of gas, they flow upward, as is usual, through vertical uptakes arranged with the air uptake adjacent to and directly behind the gas uptake, until the level of the furnace port is reached. There the two streams are turned from their vertical course and carried transversely to the port. As in the vertical flow the stream of air passes upward behind, that is at greater distance from the furnace than the stream of gas, so when the two streams are deflected to transverse courses, the stream of air overlies the stream of gas.

The reaches of the two passageways through which the streams are carried in transverse courses are indicated in the drawings at 5 and 6. It will be observed that they so far depart from horizontal extent,—passageway 5 being upwardly inclined and passageway 6 downwardly—that they converge and meet in port 4.

Between the vertical reaches of the passageways the dividing wall ordinarily will be and in this instance is shown to be a solid wall of masonry 7. The converging reaches 5 and 6 are formed by double masonry walls between which is an open space 8, through which the open air has free access.

The division wall between the air and gas passageways is at its furthermost end exposed to great heat from the flame. The provision which I make and have now described, of a wall which at its furthermost end is double and air-cooled, is a feature which in and of itself prolongs the life of the structure.

Across this open space 8 from side to side extends a fuel pipe 9, and from pipe 9 spring nozzles which extend into and open through orifices in the masonry, directing jets of infed fuel into the body of air and gas, at the very point where the thitherto separate streams meet.

Any suitable fuel may be so introduced. I contemplate, primarily, the use of natural gas, under pressure; instead of natural gas other fuel may be used, or liquid fuel, more or less completely vaporized by heat, or coal dust borne on a stream of air or other gas. The fluid so jetted in will, of necessity, be supplied under pressure.

The purpose and effect is manifold: to enrich the combustible mixture, to accelerate the flow of gas and air from the regenerators, produce an intenser, hotter flame, and to effect more complete combustion within the furnace chamber. The use of one or another of the substances suggested, and the introduction under one degree of pressure or another, or under variable pressure, will achieve in varying degree some or all of the effects mentioned. The fluid fuel so introduced may be preheated or not, as found desirable and convenient.

I show two nozzles 10 for the injetted fluid fuel, and they are shown to be arranged near opposite sides of the confluence of the streams through reaches 5 and 6 into port 4, and to be convergently directed. Manifestly the particular number and the minute arrangement of these nozzles may be varied at will. And the minute construction of the nozzles I leave to the election of the engineer. I show simple lengths of pipe, and they will answer all present purposes.

Giving attention to the operation of the furnace as a whole, it will be understood that fluid is projected from pipe 9 into the furnace port at the intake end of the furnace only; at the outgo end flow through the pipe 9 is cut off. When the furnace is reversed one pipe 9 is closed, the other, at the opposite end of the furnace opened.

The opening 8 through the masonry, across the port from side to side, affords then not only cooling of the wall at a point where cooling is desired, it affords also opportunity for the introduction of an air cooled pipe from which fluid may be jetted into the port, at the meeting point of the convergent streams of air and of gas, to achieve, according to the needs of the particular case, some or all of the purposes and effects described.

I have described the nearer passageway 2 as the gas passageway, and the more remote, 3, as the air passageway. This will be the usual arrangement. But, manifestly, it may be reversed, and the air may enter the furnace port in a stream underneath the stream of gas, while in other respects the arrangement and mode of operation remain as I have described them.

As I said at the beginning, and as is now manifest, this invention of mine is applicable to heating furnaces generally.

I claim as my invention:

1. In a heating furnace the combination of a furnace chamber, convergent passageways adapted to carry confluent streams of gaseous substance to said furnace chamber, a fluid conduit arranged externally of and between said convergent passageways, and a nozzle leading from said conduit through the adjacent walls and adapted to project a jet of fluid into the meeting streams at the point of confluence.

2. In a heating furnace, the combination of a furnace chamber, air and gas passageways leading to the furnace chamber and separated the one from the other by a partition wall, the said partition wall at its innermost end being double with a space between freely open to the air, and a fluid supply pipe extending into such open space and penetrating the said partition wall at the end thereof.

3. In a heating furnace the combination of a furnace chamber, passageways for air and gas converging to the furnace chamber, and means for projecting a jet of fluid toward the furnace chamber in the line of flow and at the point of confluence of the streams of air and gas flowing in said passageways.

4. In a heating furnace the combination of a furnace chamber, passageways for air and gas converging to the furnace chamber, and means for projecting a plurality of convergent jets of fluid toward the furnace chamber in the line of flow and at the point of confluence of the streams of air and gas flowing in said passageways.

5. The method herein described of firing a furnace which consists in projecting into a furnace port confluent streams of air and of gas and in projecting into the streams at their point of confluence a jet of fluid fuel.

6. The method herein described of accelerating the flow of gas and air to a furnace which consists in bringing gas and air passageways to confluence adjacent the furnace chamber and in projecting a jet of fluid fuel in the line of flow and in the direction of flow at the point where the streams borne by said passageways meet.

7. The method herein described of accelerating the flow of gas and air to a furnace which consists in causing gas and air to be carried through conduits in convergent streams to the furnace chamber, and in projecting into the streams at the point of convergence and in the direction of advance a jet of fluid fuel.

In testimony whereof I have hereunto set my hand.

HARVEY H. DEULEY.

Witnesses:
PERCY A. ENGLISH,
FRIEDA E. WOLFF.